UNITED STATES PATENT OFFICE.

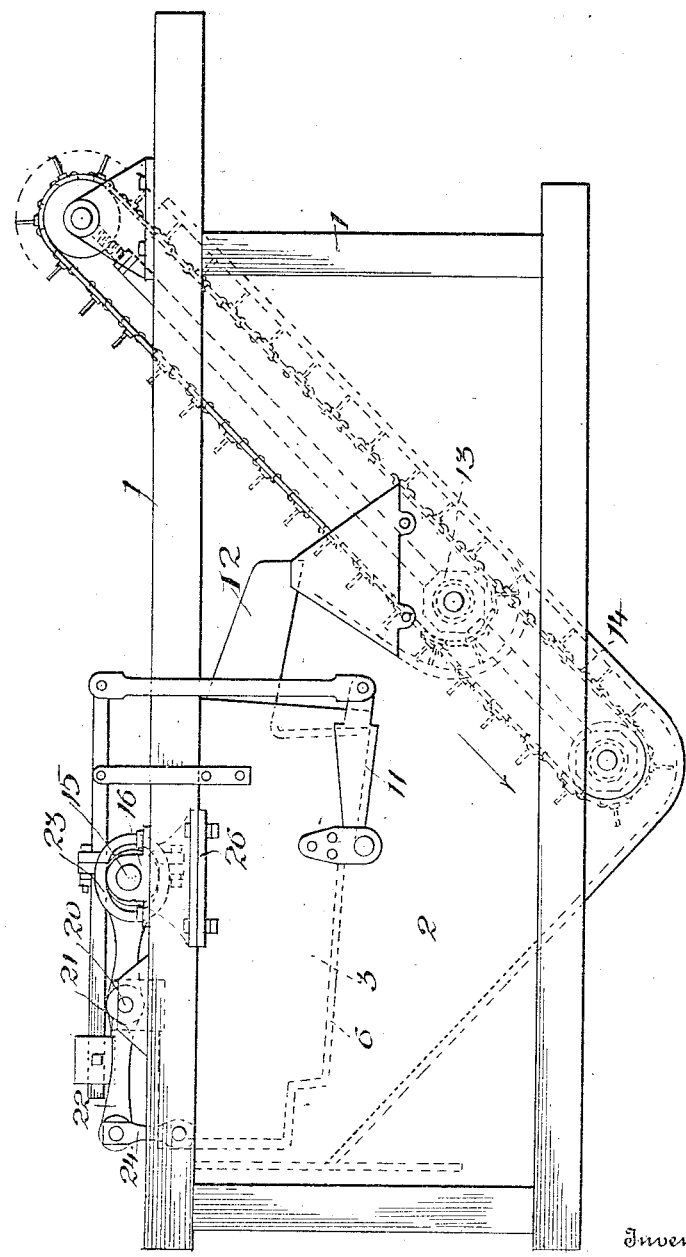

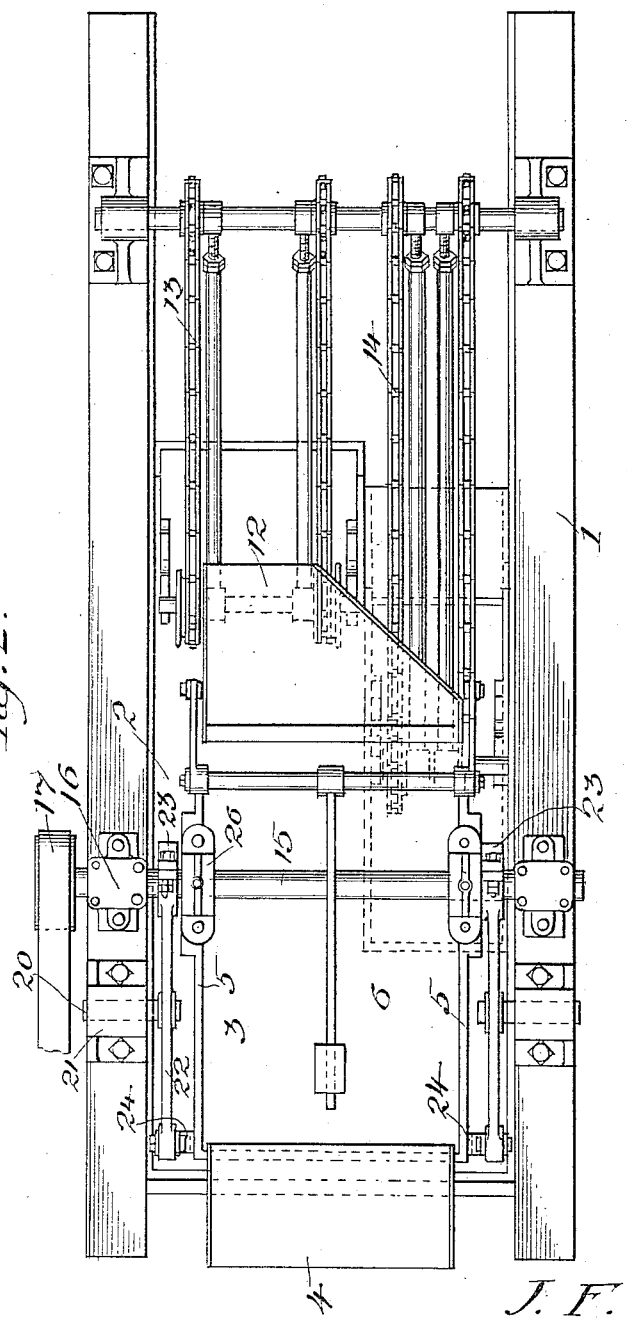

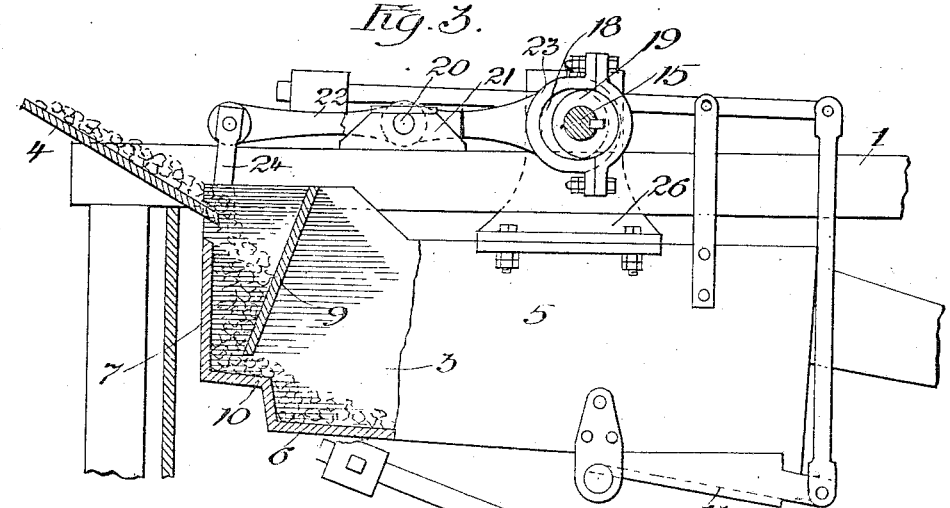
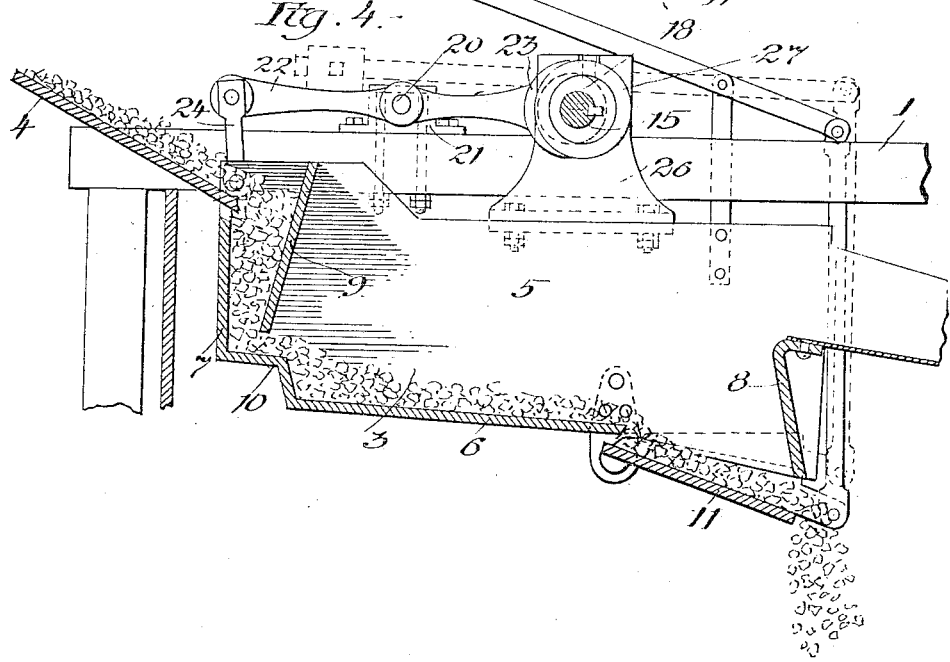

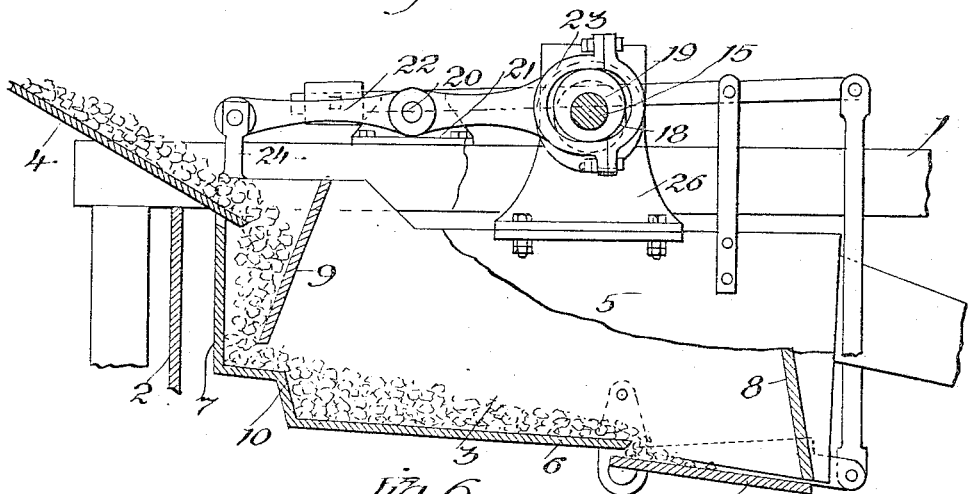
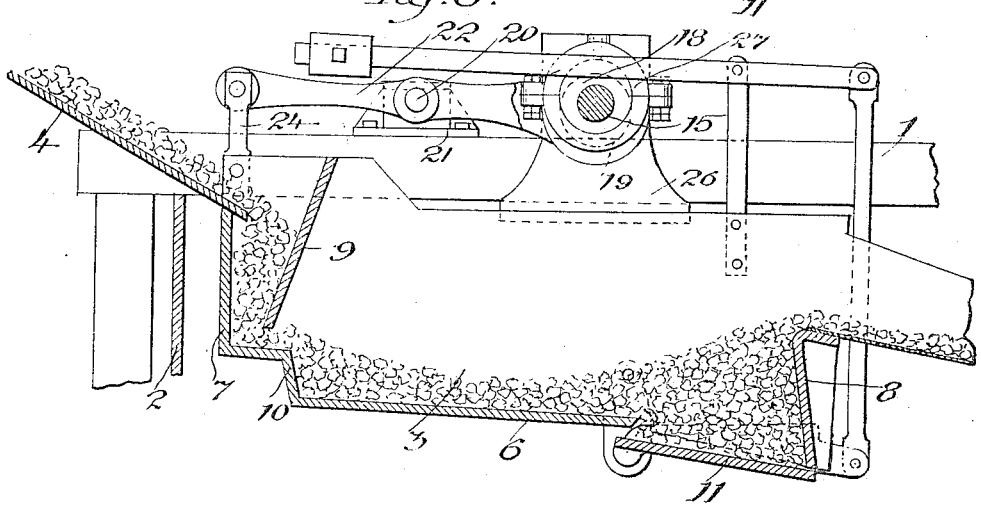

JOHN F. WAGNER, OF TAMAQUA, PENNSYLVANIA.

COAL-JIGGER.

1,288,311.	Specification of Letters Patent.	Patented Dec. 17, 1918.

Application filed April 23, 1918. Serial No. 230,331.

*To all whom it may concern:*

Be it known that I, JOHN F. WAGNER, a citizen of the United States, residing at Tamaqua, in the county of Schuylkill and State of Pennsylvania, have invented certain new and useful Improvements in Coal-Jiggers, of which the following is a specification.

This invention is designed as an improvement over jiggers of the type embodying a jig pan and means for imparting gyratory motion thereto. In previously designed jiggers of this type, as for example in the jigger shown in Patent No. 977,087, issued November 29, 1910, to H. W. Falkner, F. Schultz and myself, it has been customary to gyrate the jig pan by the action of eccentrics mounted upon parallel shafts and driven by a connecting belt or chain or other gear connection. The present invention has as its primary object to provide in a coal jigger of the type above mentioned, means for imparting gyratory motion to the jig pan, which means will be constructed and arranged to give to the pan a steady and positive motion and at the same time will act to maintain the pan in a level position.

Another object of the invention is to provide means for imparting gyratory motion to the jig pan, which means will embody but a single operating shaft carrying eccentrics having such an arrangement and so connected with the jig pan as to impart the desired motion to the said pan and so that the second shaft usually employed is dispensed with as well as sprocket or other gearing for transmitting motion from one shaft to the other.

In the accompanying drawings:

Figure 1 is a side elevation of the jigger embodying the present invention;

Fig. 2 is a top plan view thereof;

Figs. 3, 4, 5 and 6 are vertical longitudinal sectional views through a jig pan and illustrating in elevation and partly in section, the means provided for imparting gyratory motion to the said pan in the operation of the machine.

The numeral 1 indicates in general the supporting frame structure of the machine, and the numeral 2 indicates the washing tank in which the jig pan is to operate, the said pan being indicated in general by the numeral 3. The chute which discharges into the jig pan is indicated by the numeral 4 and the same extends at its discharge end above what may be considered the rear end of the said jig pan. The jig pan comprises side walls 5, a bottom 6, a rear end wall 7 and a forward end wall 8, there being a partition wall 9 arranged within the jig pan and extending transversely thereof and located opposite the rear wall 7 of the said pan. The partition wall 9 is inclined downwardly and rearwardly and at its lower edge is spaced above a stepped portion 10 of the bottom wall 6 of the jig pan, the said partition wall 9 forming in conjunction with the rear end wall 7, a hopper into which the chute discharges, and the bottom of which hopper discharges onto the said stepped portion 10 of the bottom of the pan. Thus by the provision of the wall 9, the coal and the slate mixed therewith is prevented from being thrown any considerable distance beyond the discharge end of the chute 4 and is in fact compelled to first pass over the stepped portion 10 before reaching the true bottom of the pan. At its forward end the pan is provided with the usual gate 11 hinged at the forward end of the bottom of the pan and designed to provide for discharge of the slate from the pan into the washing tank 2. At its forward end the jig pan is provided with a discharge spout 12 designed to discharge onto a conveyer of the endless traveling type indicated in general by the numeral 13. A similar conveyer 14 is arranged beside the conveyer 13, but at its rear end extends downwardly into the bottom of the washing tank 2. Of course, coal passing over the upper edge of the front end wall 8 of the jig pan and into the spout 12, will be delivered to the conveyer 13 and elevated by the same, whereas slate and other foreign matter in the coal will be first discharged into the washing tank 2 past the gate 11 and then carried upwardly and discharged by the conveyer 14.

As before stated, means is provided for imparting gyratory motion to the jig pan and at the same time maintaining the pan in a level position so that the coal to be washed will not be initially thrown beyond the stepped portion 10 or caused to travel too rapidly from the rear to the forward end of the said pan. The means for accomplishing this result includes a shaft 15 which is rotatably mounted in suitable bearings 16 upon the supporting frame structure 1, the said shaft being rotated by means of a drive belt and pulley, indicated by the numeral 17, or in any other desired manner. Fixed upon the shaft 15 near each end thereof and slightly beyond the planes of the side walls of the jig pan, are eccentrics indicated by the numeral 18, and similar eccentrics 19 are fixed upon the said shaft, one immediately inwardly of each of the eccentrics 18. By reference to Figs. 3, 5 and 6 of the drawings, it will be observed that the eccentrics 18 and 19 are relatively oppositely positioned with relation to the axis of the shaft 15, and being fixed to the said shaft, these eccentrics, of course, maintain their relative positions in the rotation of the said shaft. Mounted upon stub shafts 20 journaled in suitable bearings 21 upon the supporting frame structure 1, are rock arms 22, these arms being located in front to rear alinement with the respective eccentrics 18. Each arm 22 at its forward end carries an eccentric strap 23 surrounding the corresponding eccentric 18. The strap 23, however, does not as is ordinarily the case define a circular opening snugly receiving the eccentric 18, but the opening of the strap, indicated by the numeral 25, is somewhat of elliptical form, the opening in its vertical dimension being equal to the diameter of the eccentric and in its horizontal dimension being somewhat greater than the diameter of the eccentric. As a consequence the eccentrics 18 act upon their respective straps 23 solely to raise and lower, or cause up and down movement of the said straps, the eccentrics having no effect upon the straps tending to reciprocate the same in a horizontal or back and forth direction. As a consequence in the rotation of the shaft 15, the eccentrics act in connection with their respective straps 23, to impart oscillatory motion to the rock arms 22. Links 24 are pivotally connected at their upper ends to the rear ends of the arms 22, and at their lower ends are pivotally connected at the upper rear corners of the jig pan. As a consequence when the forward ends of the arms 22 are swung downwardly through the action of the eccentrics 18, the rear ends of the arms will be swung upwardly carrying with them the rear end of the jig pan, and on the other hand when the forward ends of the arms are swung upwardly through the action of the eccentrics 18, the rear ends of the said arms will be swung downwardly carrying with them the said rear end of the jig pan. The numeral 26 indicates brackets which are secured to the upper edges of the side walls 5 of the jig pan in advance of the center thereof, and these brackets are provided with eccentric straps 27 which surround and snugly receive the eccentrics 19, as clearly shown in Fig. 4 of the drawings. As before stated, the eccentrics 18 and 19 are relatively offset in opposite directions with relation to the axis of the shaft 15, and consequently when the eccentrics 18 are acting against the straps 23 to move these straps in an upward direction and consequently lower the rear end of the jig pan, the eccentrics 19 are acting against the straps 27 to move the brackets 26 downwardly, thereby correspondingly lowering the forward end of the jig pan. In like manner when the rear end of the jig pan is elevated through the action of the eccentrics 18, the eccentrics 19 will simultaneously act to elevate the forward end of the jig pan. Therefore the jig pan is maintained in level position. However, as the eccentrics 19 fit snugly within the openings in their respective straps 27, these eccentrics will impart back and forth motion to the said pan in the rotation of the shaft 15.

Having thus described the invention, what is claimed as new is:

1. In a machine of the class described, a jig pan, a shaft, means for rotating said shaft, means operated by said shaft and forming a direct connection between the same and one end of the jig pan for imparting an up and down and back and forth motion to said end of said jig pan, and means operated by said shaft and connected with the opposite end of the jig pan to impart an up and down motion only thereto.

2. In a machine of the class described, a jig pan, a shaft, an eccentric upon the shaft, an eccentric strap working thereon and connected directly with the jig pan, a second eccentric upon the shaft, an elliptical eccentric strap working upon the second-mentioned eccentric, an arm pivotally supported between its ends and connected at one side of its pivot with the elliptical eccentric strap and at the other side of its pivot with the said pan.

3. In a machine of the class described, a jig pan, a rocking member, operative connection between the pan and the rocking member at one side of the pivot for the latter, a rotary shaft, operative connection between the shaft and the rocking member at the other side of the pivot for the latter for imparting rocking motion to the said member, and means operated by the shaft and directly connecting the same with the jig pan for imparting up and down and back and forth movement to the jig pan.

4. In a machine of the class described, a jig pan, suspending members connected at spaced points with the pan one of said members being pivotally and the other rigidly attached to the pan, a rocker connected at one side of its pivot with the pivotal suspension member, a shaft, direct operative connection between the shaft and the rocker at the other side of the pivot for the latter for imparting rocking motion to the rocker in the rotation of the shaft, and direct operative connection between the rigid suspension member and the said shaft for imparting up and down and back and forth movement to the said member, the said operative connections with the shaft working in opposition to each other whereby to maintain the level position of the pan.

5. In a machine of the class described, a shaft having opposed crank elements mounted thereon, a jig pan, a rocker swingingly connected at one side of its pivot with the said pan and having slotted connection at the other side of its pivot with one of the crank elements, and a suspension member rigidly connected with the said pan at the other side of the pivot for the rocker and having pivotal connection only with the other crank element upon the said shaft.

6. In a machine of the class described, a jig pan, a shaft, means for rotating said shaft, opposed eccentrics on said shaft arranged adjacent the sides of the jig pan, suspending members rigidly secured to the jig pan and provided with circular straps fitting around certain of said eccentrics, rocker arms pivoted intermediate their ends and provided at their forward ends with elliptical straps fitting around the other of said eccentrics, and links pivoted at their lower ends to the jig pan and at their upper ends to the rear ends of said rocker arms.

In testimony whereof I affix my signature.

JOHN F. WAGNER. [L. S.]

Copies of this patent may be obtained for five cents each, by addressing the "Commissioner of Patents, Washington, D. C."